Dec. 22, 1931.   P. PREISS   1,837,922
WATER BORNE VEHICLE ON WHEELS
Filed Jan. 22, 1930
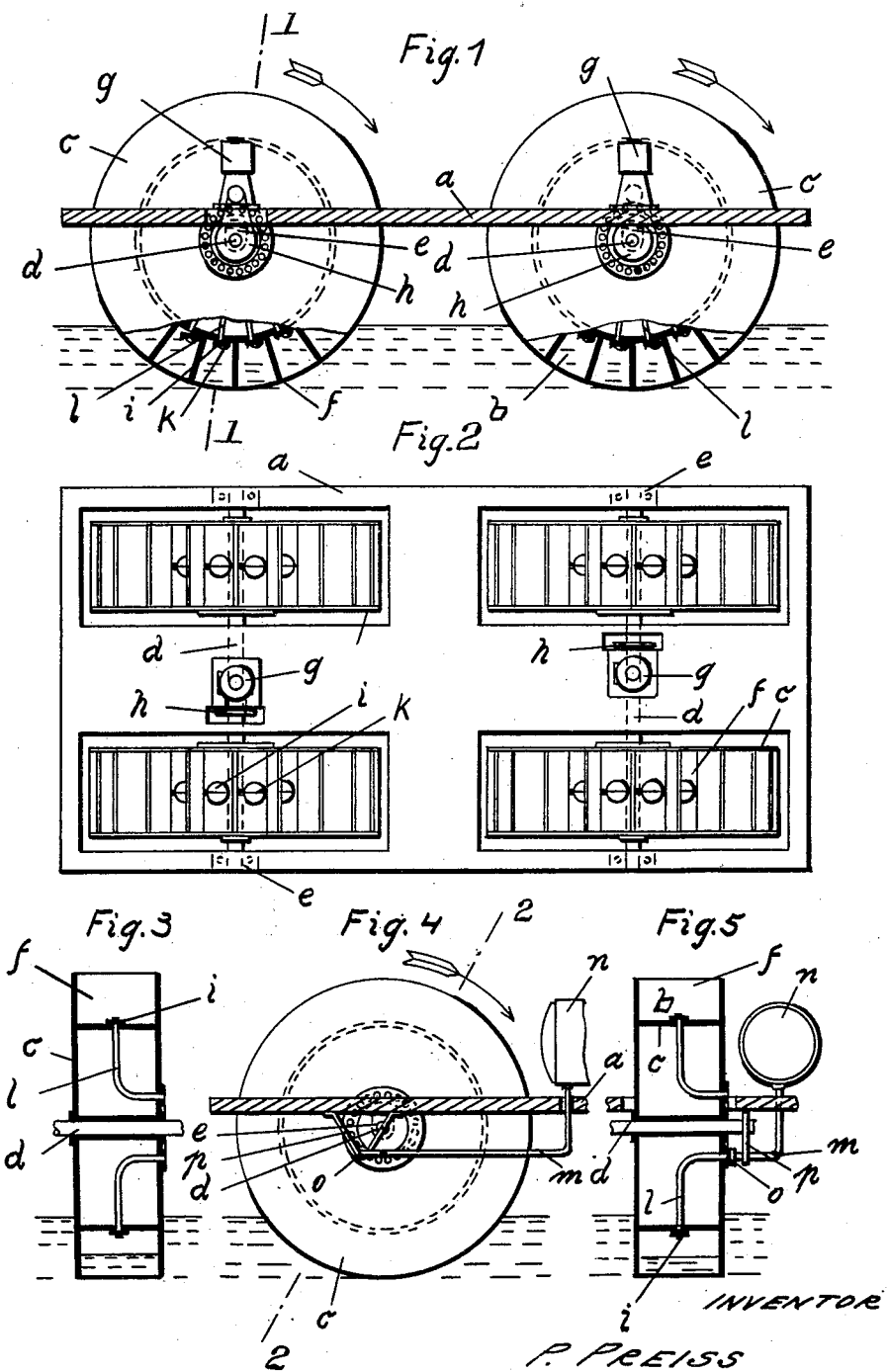
INVENTOR
P. PREISS

Patented Dec. 22, 1931

1,837,922

UNITED STATES PATENT OFFICE

PAUL PREISS, OF BREMEN, GERMANY

WATER-BORNE VEHICLE ON WHEELS

Application filed January 22, 1930, Serial No. 422,654, and in Germany January 23, 1929.

The present invention concerns a water-borne transportation device, the principle underlying it being that of a wheeled vehicle made to move on the water in a manner similar to that in which ordinary vehicles are made to move on land.

Transportation devices of the kind referred to are nothing new. Their movement on the water is effected in various ways, either by diver's bells the opening planes of which are arranged at right angles to the surface of the water or by wheels which are drum-shaped hollow bodies or are closed and have air chambers affixed to their circumference. The water-borne wheeled vehicle here described belongs to the type of those propelled by hollow wheels; but it differs from those already known in that a separation has been effected between the wheel body and the water. In order to effect this, the tread of each wheel has been fitted with chambers after the manner of a diving bell, arranged radially to the centre of each wheel. The presence of these chambers causes the formation of an air cushion surrounding each wheel body during the time it is within the water. The object of the separation thus brought about by the air cushions is to prevent a suction vortex between the wheel body and the water at the projecting chambers owing to their slanting position. Builders of vehicles for use on land or in the air also endeavor to eliminate as far as possible the suction vortex of the air formed at the rear of such vehicles when they are moving. The suction vortex of water, in connection with ships or with the wheeled water-borne vehicles or float rollers already known, is much greater than that of the air. The water-borne vehicle here described is designed in such a manner that no suction vortex can be formed by the water of the projecting chambers when the wheels are revolving, because between the wheel body and the water there is a layer of air. Moreover, the walls that form the chambers resembling diving bells and that are partly still submerged in the water can leave the water more or less in the direction of their longitudinal axis, since they occupy a position oblique to the surface of the water.

The accompanying drawings illustrate the invention here described. The figures show:

Fig. 1 a longitudinal section of the water-borne wheeled vehicle;

Fig. 2 a view of the ground plan;

Fig. 3 a section across the wheel shown in Fig. 1;

Fig. 4 a wheel, and

Fig. 5 a section of Fig. 4.

The frame (a) is supported by the chambers (b) fitted to the wheels (c), said chambers being in shape similar to diving bells and being arranged side by side of each other along the periphery of the wheels. The wheels (c) are keyed on to shafts (d) which are affixed to the frame (a) by means of bearings (e). (f) are the walls, separating the various chambers; (g) the machinery which transmits the driving power to the shafts (d) by way of the pulleys (h); (i) the non-return valves or check valves, arranged in the various chambers and sligthly pressed down by the springs (k). Finally, (l) are the pipes conveying outside air to the chambers (b).

When the wheels are revolving, the walls (f)—which form the chambers—are immersed in a direction oblique to the surface of the water, so that some part of the water enters the chambers (b). Seeing that the chambers are simultaneously filled with air and that this air is positively conveyed by them, it forms a permanent air cushion between the wheel body and the water, not only when the wheels are at rest, but also when they are in rapid or slow motion. The compression of the air is greatest in the vertical medial line of the wheel. Theoretically, the compression of the air in the chambers leaving the water is equal to that of the chambers entering it. The water compressed by the wheel body owing to the air forms a water trough (water furrow) and its level is lowest under the vertical medial line of the wheel. Since water also possesses a certain degree of inertia, the water furrow formed near the chambers leaving the water is not re-filled immediately, provided that the vehicle is moving along fairly rapidly, so that there will be a sucking action at the wheel body which is just about to leave the water. Hence, a partial vacuum is formed in the air with which the chambers leaving the water are filled. In order to prevent the resulting suction vortex—which would increase as the speed of the vehicle increases—check valves have been fitted to the various chambers. These check valves (*i*) are pressed down by the compressed air as soon as the chambers immerse in the water; but as soon as a partial vacuum is formed in the chambers leaving the water, they are opened and permit some outside air to enter by way of the pipe (*l*), so that the suction vortex is completely eliminated.

The innovations introduced by the invention are: (1) the tread of the wheel, as fitted with chambers resembling diving bells and arranged radially around a completely enclosed hollow body; (2) the admission of outside air to the chambers by way of the check valves (*i*) and the pipes (*l*).

Another means of setting the wheeled water-borne vehicles in motion in conformity with the principles underlying this invention consists in the conveying of compressed air to the chambers shortly before their leaving the water. The impact between the compressed air and the water, due to the former, is propagated radially towards the centre of the wheel, i. e., in the direction in which the vehicle is moving forward. This is illustrated in Figs. 4 and 5, where (*m*) is a pipe conducting the compressed air from the container (*n*) through pipe (*l*) into the chambers shortly before they emerge from the water, the flange (*o*) sliding along the aperture of the pipe (*l*). The support (*p*) adjusts the position of pipe (*l*) in such a way that the compressed air can only enter the chamber just about to emerge from the water.

The water-borne vehicle here described may also be propelled by ships' propellers, rockets, or sails, or after the manner of a closed vehicle.

What I claim to be new is:

1. A water traveling vehicle including wheel-like supports formed with a plurality of peripheral chambers serving as air traps when submerged, the water receiving space of each of said chambers being closed to air admission during submergence and open to air admission at a point in the movement of the support where the trapped air would otherwise function as a vacuum, with a consequent suction effect on the body of water.

2. A water traveling vehicle including wheel-like supports having a peripheral series of chambers open at their outer ends, valves controlling openings at the inner ends of the chambers and held closed by pressure from the outer ends, and means whereby air is admitted to the chambers when the pressure from the outer ends of the chambers is less than the pressure of the air to be admitted, whereby the particular chamber emerging from the water is relieved of vacuum tendency to avoid suction in the water.

3. A water traveling vehicle including wheel-like supports formed with a series of peripheral chambers serving as air traps when submerged, and means for admitting air under pressure to the particular chamber leaving the water to thereby interrupt the vacuum tendency of the trapped air and thus prevent a suction vortex.

4. A water traveling vehicle including wheel-like supports formed with a series of peripheral chambers serving as air traps when submerged, and means for admitting air under pressure to the particular chamber leaving the water, said air being under sufficient pressure to interrupt the vacuum tendency of the trapped air and assist in the expulsion of the water from the chamber to thereby add to the driving effect of the wheel-like support.

In testimony whereof I affix my signature.

PAUL PREISS.